(12) United States Patent
Sherbondy

(10) Patent No.: US 10,305,720 B1
(45) Date of Patent: May 28, 2019

(54) VIRTUAL REALITY GAMING APPARATUS

(71) Applicant: Daniel Sherbondy, Las Vegas, NV (US)

(72) Inventor: Daniel Sherbondy, Las Vegas, NV (US)

( * ) Notice: Subject to any disclaimer, the term of this patent is extended or adjusted under 35 U.S.C. 154(b) by 0 days.

(21) Appl. No.: 15/699,043

(22) Filed: Sep. 8, 2017

(51) Int. Cl.
| | |
|---|---|
| *A63F 13/21* | (2014.01) |
| *G06F 3/01* | (2006.01) |
| *H04L 29/06* | (2006.01) |
| *G02B 27/01* | (2006.01) |

(52) U.S. Cl.
CPC ........ *H04L 29/06034* (2013.01); *A63F 13/21* (2014.09); *G02B 27/0172* (2013.01); *G06F 3/011* (2013.01)

(58) Field of Classification Search
None
See application file for complete search history.

(56) References Cited

U.S. PATENT DOCUMENTS

| | | | | |
|---|---|---|---|---|
| 5,980,256 | A * | 11/1999 | Carmein | A63B 22/02 434/29 |
| 2015/0346722 | A1* | 12/2015 | Herz | G05D 1/0038 701/2 |
| 2016/0284226 | A1* | 9/2016 | Rheiner | G09B 9/08 |
| 2018/0126263 | A1* | 5/2018 | Seiler | G09B 5/06 |

* cited by examiner

*Primary Examiner* — Damon J Pierce
(74) *Attorney, Agent, or Firm* — Gulf Coast Intellectual Property Group

(57) ABSTRACT

A portable virtual reality gaming station that is configured to provide a plurality of tactile sensations during the course of playing a game thereon. The portable virtual reality gaming station includes an annular shaped platform having a central aperture with a fan disposed therein. A support frame extends upward from the platform and is configured to partially encircle the platform. A mounting post is provided and has operably secured thereto a user suspension assembly. The portable virtual reality gaming station includes a central processing unit configured to support operations thereof. A first dispenser and a second dispenser are provided wherein the first dispenser is configured to discharge a liquid and the second dispenser is configured to provide an olfactory sensation to a user. A second fan and third fan are provide to direct streams of air in alternate directions to a user. An external monitor is further included.

20 Claims, 2 Drawing Sheets

VIRTUAL REALITY GAMING APPARATUS

PRIORITY UNDER 35 U.S.C SECTION 119(E) & 37 C.F.R. SECTION 1.78

This nonprovisional application claims priority based upon the following prior United States Provisional Patent Application entitled: Virtual Reality Experience, Application No. 62/393,373 filed Sep. 12, 2016, in the name of Daniel Sherbondy, which is hereby incorporated by reference for all purposes.

FIELD OF THE INVENTION

The present invention relates generally to electronic games, more specifically but not by way of limitation, a virtual reality gaming station that is configured to support a user and provide tactile senses associated with a video game to which the virtual reality gaming station is operably coupled.

BACKGROUND

Millions individual routinely play video games. Over the last decade, the proliferation of video games has amassed popularity across all demographics. What once was the focus of a small subset of the population is now a critical mas phenomena and is continuing to grow in popularity. One feature that has been critical for the aforementioned rise in participation is the advent of virtual reality. The video game industry has migrated from a two dimensional experience to a three dimensional experience that is able to attract a much broader demographic. Virtual reality provides a visually immersive experience wherein the user is optically engaged to a level where a feeling of physical participation is achieved.

One issue with the present virtual reality gaming is the current limitations thereof. While current virtual reality gaming does provide an optical sensation, existing virtual reality games do not provide any tactile experience. Existing virtual reality gaming consists of sound equipment such as but not limited to headphones and a virtual reality headset. Virtual reality headsets typically cover the eyes and are operable to provide a visual three dimensional experience. The aforementioned conventional virtual reality equipment is not configured to provide tactile experiences such as but not limited to temperature or sensations.

Accordingly, there is a need for a virtual reality gaming station that is configured to enhance a virtual reality game by providing features such as but not limited to temperature and sensations.

SUMMARY OF THE INVENTION

It is the object of the present invention to provide a virtual reality gaming station that is portable and further being operable to facilitate the playing of a virtual reality video game wherein the station is annular in shape and configured to have a player superposed thereon.

Another object of the present invention is to provide a virtual reality gaming station that is configured to provide tactile sensations during the playing of a virtual reality video game wherein virtual reality gaming station includes a base platform that is configured to be movable.

A further object of the present invention is to provide a virtual reality gaming station that is portable and further being operable to facilitate the playing of a virtual reality video game that further includes a plurality of fans that are configured to provide an airstream in response to the situational environment represented in the virtual reality game being played by a user of the virtual reality gaming station.

Still another object of the present invention is to provide a virtual reality gaming station that is configured to provide tactile sensations during the playing of a virtual reality video game that further includes a mounting post wherein the mounting post is configured to provide support for a video monitor and user engagement equipment.

An additional object of the present invention is to provide a virtual reality gaming station that is portable and further being operable to facilitate the playing of a virtual reality video game that further includes a user support apparatus that is configured to suspendedly support a user during use of the virtual reality gaming station wherein the user support apparatus is operably coupled to the mounting post.

Yet a further object of the present invention is to provide a virtual reality gaming station that is configured to provide tactile sensations during the playing of a virtual reality video game that further includes a moisture dispenser, wherein the moisture dispenser is electronically coordinated with a video game being played on the virtual reality gaming station so as to dispense moisture therefrom during the video game.

Another object of the present invention is to provide a virtual reality gaming station that is portable and further being operable to facilitate the playing of a virtual reality video game that further includes a temperature source, wherein the temperature source is configured to increase the temperature of the virtual reality gaming station and the immediate area adjacent thereto.

Still an additional object of the present invention is to provide a virtual reality gaming station that is configured to provide tactile sensations during the playing of a virtual reality video game that further includes an olfactory assembly, wherein the olfactory assembly is configured to produce scents during the course of utilizing the virtual reality gaming station.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
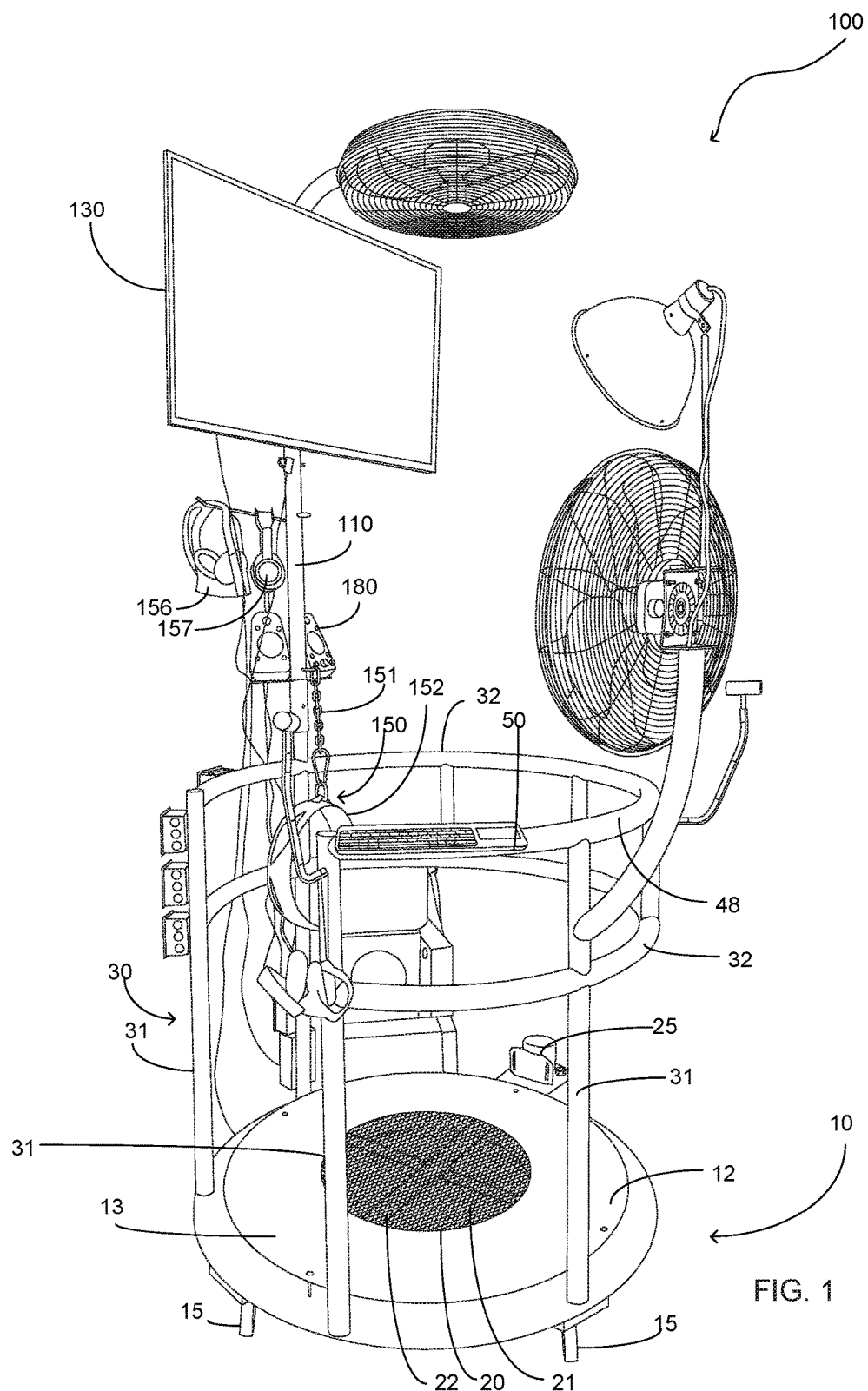
FIG. 1 is a perspective view of the present invention.

Referring now to the drawings submitted herewith, wherein various elements depicted therein are not necessarily drawn to scale and wherein through the views and figures like elements are referenced with identical reference numerals, there is illustrated a virtual reality gaming station 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to Figures submitted herewith the virtual reality gaming station 100 includes a base 10 being annular in shape. The base 10 is manufactured from a suitable durable material such as but not limited to metal. The base 10 includes platform 12 configured to have a user superposed thereon. The platform 12 includes upper surface 13 and lower surface 14 wherein the lower surface 14 has wheels 15 operably coupled thereto. The platform 12 is constructed having a suitable diameter so as to accommodate a player thereon. It is contemplated within the scope of the present invention that the platform 12 could be constructed in alternate diameters and achieve the desired functionality described herein.

Centrally disposed on the platform 12 is aperture 20. Aperture 20 is covered by screen 21. Screen 21 is constructed of a suitable durable material such as but not limited to metal and is configured to support the weight of a user thereon. Beneath the screen 21 is first fan 22. First fan 22 is an electrically operated fan configured to direct a stream of air upwards therefrom wherein the stream of air is perpendicular to the platform 12. First fan 22 provides a tactile experience of wind direction in an upwards manner during playing a virtual reality game such as but not limited to a roller coaster wherein during the downward plunge of a roller coaster the first fan 22 is activated so as to provide an upwardly directed stream of air so as to enhance the experience and feeling of a rapid descent. While a single first fan 22 is illustrated herein as being centrally located on the platform 12, it is contemplated within the scope of the present invention that the platform 12 could have more than one fan positioned to direct a stream of air upward from the platform 12.

Operably coupled to platform 12 is bass transducer 25. Bass transducer 25 is electronically coupled to the central processing unit 50 utilizing suitable techniques. The bass transducer 25 is configured to provide sound vibrations that reverberate through the platform 12 during the playing of a virtual reality video game. The bass transducer 25 is a tactile transducer configured to provide a feeling and/or sensation to a user superposed on the virtual reality gaming station 100 for low bass frequencies. The bass transducer 25 transmits low frequency vibrations into the platform 12 so as to be felt by a user superposed thereon. The bass transducer 25 is securely mounted to platform 12 utilizing suitable durable techniques such as but not limited to mechanical fasteners. The bass transducer 25 includes a small weight (not illustrated herein) wherein forces being exerted thereon transfer into the platform 12. While the virtual reality gaming station 100 has a single bass transducer 25 illustrated and discussed herein, it is contemplated within the scope of the present invention that the platform 12 could have more than one bass transducer 25 operably coupled thereto.

Secured to the platform 12 and extending upward therefrom is support frame 30. Support frame 30 includes a plurality of vertical members 31 and horizontal members 32 integrally formed. The support frame is configured to substantially encircle the platform 12 and includes opening 35 that is of suitable size so as to allow a user to enter the virtual reality gaming station 100 so as to stand on the platform 12. The support frame 30 is manufactured from a suitable durable material such as but not limited to metal tubing and the vertical member 31 and horizontal members 32 are secured utilizing suitable techniques such as but not limited to welding. While metal tubing is preferred for the support frame 30, it is contemplated within the scope of the present invention that the support frame 30 could be manufactured from suitable alternate materials. While no particular height is required, good results have been achieved utilizing a support frame 30 that extends upward from the platform 12 at least three feet. Secured to vertical member 37 is second fan 40. Second fan 40 is an electrically operated fan that is secured to vertical member 37 via mount 39. Mount 39 is manufactured from metal tubing and is arcuate in shape extending outward from the support frame 30. The second fan 40 is configured to direct a stream of air generally parallel with a user's torso wherein the user is standing on the platform 12. The second fan is operably coupled to central processing unit 50 and is activated as needed during the playing of a virtual reality video game simulating an oncoming breeze or other situational effect.

Secured to mount 39 is heat source 60. Heat source 60 is electrically coupled to power junction 95 and is configured to provide an increase in the temperature of the virtual reality gaming station 100 during utilization thereof upon situational requirement. By way of example but not limitation, the heat source 60 is powered on to provide an increase in temperature when a user of the virtual reality gaming station 100 is playing a game wherein the environment is hot such as but not limited to a desert. While one heat source 60 is illustrated herein, it is contemplated within the scope of the present invention that the virtual reality gaming station 100 could have more than one heat source 60. While no particular type of heat source is required, good results have been achieved utilizing an infrared bulb.

Secured to vertical member 57 is a first dispenser 65. First dispenser 65 is operably coupled to the central processing unit 50 and is configured to provide a tactile sensation in association with a portion of a game being played on the virtual reality gaming station 100. The first dispenser 65 is configured to dispense a liquid, in particular, provide a mist or spray that is directed onto a user of the virtual reality gaming station 100. The liquid discharged from the first dispenser 65 is water or a similar substance and the liquid dispenser 65 includes the operational elements to receive, store and discharge a liquid. The first dispenser 65 is configured to dispense liquid so as to provide a tactile moisture effect when a user of the virtual reality gaming station 100 is playing a game wherein the game is simulating being proximate an aqueous environment. While one first dispenser 65 is illustrated herein, it is contemplated within the scope of the present invention that the virtual reality gaming station 100 could have more than one first dispenser 65 configured to discharge a liquid.

A second dispenser 70 is mounted to the support frame 30 and is configured to provide an olfactory experience for a user of the virtual reality gaming station 100. The second dispenser is configured 70 to have stored therein at least one substance operable to produce a particular odor. During play of a game on the virtual reality gaming station 100 the central processing unit 50 transmits a signal to the second dispenser 70 to emit a fragrance wherein the fragrance is associated with the environment that a player is being virtually presented. It is contemplated within the scope of the present invention that the second dispenser 70 could dispense more than one fragrance and it is further contemplated that the virtual reality gaming station 100 could have more than one second dispenser 70.

The central processing unit 50 is secured to the top horizontal member 48 utilizing suitable durable techniques. The central processing unit 50 includes the necessary electronics to receive, store, transmit and manipulate data and is operable to control the operation of the virtual reality gaming station 100. It should be understood within the scope of the present invention that the central processing unit 50 could be operably coupled to an additional computing unit distal to the virtual reality gaming station 100. It is further contemplated within the scope of the present invention that the central processing unit 50 could be comprised of alternate user interfaces such as but not limited to a keyboard or touch screen.

Secured to support frame 30 is mounting post 110. Mounting post 110 is secured to support frame 30 utilizing suitable durable techniques and is manufactured from metal tubing or other suitable material. The mounting post 110 includes upper end 112 that is configured to support third fan 120 and monitor 130. The third fan 120 is positioned so as to direct a stream of air downward on a user. The third fan 120 is operably coupled to the central processing unit 50 and receives a signal therefrom during playing of a game on the virtual reality gaming station 100 to direct a stream of air downward onto a user. The monitor 130 is a conventional LCD display that is operably coupled to the central processing unit 50 and is configured to display the identical image as being displayed in the headset 155. The image displayed on the monitor 130 is provided for individuals proximate to the virtual reality gaming station 100 so they may see the same image as the player is seeing on the headset 155. It is contemplated within the scope of the present invention that the virtual reality gaming station 100 could have more than one monitor 130 and the monitor 130 could be provided in various alternate sizes.

Figure 2:
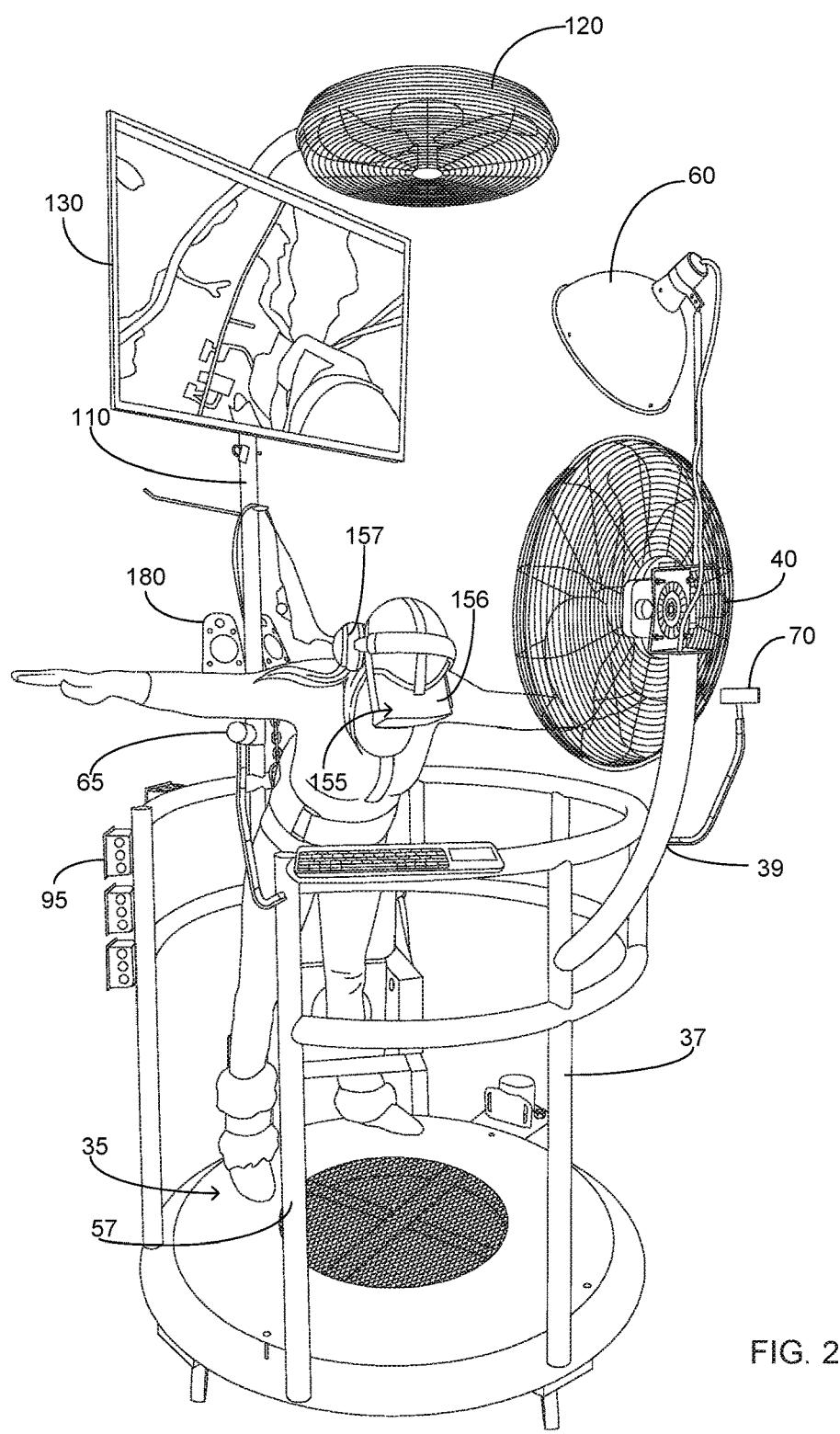
FIG. 2 is a perspective view of the present invention with a user engaged therewith.

Secured to the mounting post 110 beneath the monitor 130 is the user suspension assembly 150. The user suspension assembly 150 is configured to partially suspend a user as illustrated herein in FIG. 2. The user suspension assembly 150 facilitates partial suspension of a user so as to enhance effects such as but not limited to flying or falling when being visually presented images thereof on the headset 150. The user suspension assembly 150 includes chain 151 and belt 152. Chain 151 is a conventional chain and is operably coupled to the mounting post 110 utilizing suitable durable techniques. Secured to chain 151 distal to the mounting post 110 is belt 152. The belt 152 is configured to be circumferentially disposed around the waist of a user. It is contemplated within the scope of the present invention that the belt 152 could be manufactured from various alternate materials and achieve the desired objective herein. It is further contemplated within the scope of the present invention that the alternate materials could be utilized in place of or in conjunction with the chain 151 to secure the belt 152 to the mounting post 110.

The virtual reality gaming station 100 includes headset 155. Headset 155 is configured to be mounted to a user's head wherein the display 156 thereof is over the user's eyes and the headphones 157 are adjacent a user's ears. The headset 155 is a conventional virtual reality headset operably coupled to the central processing unit 50 and configured to provide sound and visual images to a user during the playing of a game.

Secured to mounting post 110 are speakers 180. Speakers 180 are conventional audio speakers and are operably coupled to the central processing unit 50. The speakers 180 provide a duplicate sound being transmitted to headphones 157 so in conjunction with the image being displayed on monitor 130, individuals proximate the virtual reality gaming station 100 are able to see and hear the same information being presented to a user during the playing of a game. While two speakers 180 are illustrated herein, it is contemplated within the scope of the present invention that the virtual reality gaming station 100 could have as few as one speaker 180 or more than two speakers 180.

The virtual reality gaming station 100 includes power junction 95. Power junction 95 is configured to electrically couple the virtual reality gaming station 100 to a conventional power source such as but not limited to a one hundred and twenty volt or two hundred and forty volt power supply. Power junction 95 is configured to receive conventional electrical plugs and is operable to provide the necessary power to the virtual reality gaming station 100 for operation thereof. It is contemplated within the scope of the present invention that the virtual reality gaming station 100 could have a power source integrated therewith such as but not limited to a high capacity battery.

It should be understood within the scope of the present invention that some of the elements such as but not limited to the first dispenser 65 and second dispenser illustrated herein are graphical representations thereof and it is contemplated within the scope of the present that these elements could be constructed to achieve the desired functional objective and have an alternate physical appearance.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A virtual reality gaming station operable to provide tactile sensory experiences in combination with visual images comprising:
   a platform, said platform being planar in manner, said platform having an upper surface configured to have a user superposed thereon, said platform having a centrally located aperture, said centrally located aperture having a screen disposed thereacross,
   a support frame, said support frame constructed of a plurality of vertical members and horizontal members, said support frame extending upward from said upper surface of said platform, said support frame circumferentially surrounding a portion of the platform, said support frame partially encircling said platform so as to define an opening for a user to access said platform;
   a mounting post, said mounting post being secured to said support frame, said mounting post extending upward from said support frame;
   a central processing unit, said central processing unit having the necessary electronics to receive, store, transmit and manipulate data, said central processing unit configured to control operation of the virtual reality gaming station;
   a user suspension assembly, said user suspension assembly being operably coupled to said mounting post, said user suspension assembly configured to partially suspend a user over said platform;
   a headset, said headset configured to be surroundably mounted to a user's head, said headset further including a display configured to provide a visual image to a user, said headset further including headphones, said headphones operable to provide sound to a user; and
   wherein during utilization of the virtual reality gaming station a user will be submitted to at least one tactile sensation wherein the tactile sensation is associated with visual data being presented to the user on the display of the headset.

2. The virtual reality gaming station as recited in claim 1, and further including a first fan, said first fan being mounted in said aperture of said platform, said first fan configured to direct a stream of air upwards towards a user superposed on said platform.

3. The virtual reality gaming station as recited in claim 2, and further including a first dispenser, said first dispenser being mounted to said support frame, said first dispenser operably coupled to said central processing unit, said first dispenser configured to discharge a liquid therefrom.

4. The virtual reality gaming station as recited in claim 3, and further including a second fan, said second fan being mounted to said support frame, said second fan configured to provide a stream of air that is perpendicular to a user superposed on said support platform.

5. The virtual reality gaming station as recited in claim 4, and further including a heat source, said heat source being mounted to said support frame, said heat source operable to provide a tactile experience of heat to a user during utilization of the virtual reality gaming station.

6. The virtual reality gaming station as recited in claim 5, and further including a monitor, said monitor being mounted to said mounting post, said monitor operable to provide a visual image to individuals proximate the virtual reality gaming station.

7. The virtual reality gaming station as recited in claim 6, and further including a third fan, said third fan being mounted to said mounting posts, said third fan configured to direct a stream of air downwards on a user superposed the platform.

8. A portable virtual reality gaming station that is configured to provide a plurality of tactile sensations associated with visual images being presented to a user comprising:
   a platform, said platform being annular in shape and having an upper surface, said platform having a user engagement ring member configured to have a user stand thereon, said user engagement ring member being peripherally formed on said upper surface of said platform, said platform having a centrally located aperture, said user engagement ring member circumferentially disposed said centrally located aperture, said centrally located aperture having a screen disposed thereacross, said platform having a fan operably mounted thereto, said fan being secured in said aperture, said fan configured to provide a stream of air directed upwards at a user superposed on said platform,
   a support frame, said support frame constructed of a plurality of vertical members and horizontal members, said support frame extending upward from said platform, said support frame circumferentially surrounding a portion of the platform, said support frame configured to define an opening, said opening operable to provide access for a user to access said platform;
   a mounting post, said mounting post being secured to said support frame, said mounting post extending upward from said support frame;
   a central processing unit, said central processing unit having the necessary electronics to receive, store, transmit and manipulate data, said central processing unit configured to control operation of the virtual reality gaming station;
   a user suspension assembly, said user suspension assembly being operably coupled to said mounting post, said user suspension assembly configured to angularly support a user over said centrally located aperture formed in said platform, said user suspension assembly further including a chain, said chain being secured to said mounting post, said user assembly further including a belt, said belt being secured to said chain distal to said mounting post, said belt configured to surroundably mount a torso of a user;
   a headset, said headset configured to be surroundably mounted to a user's head, said headset further including a display configured to provide a visual image to a user, said headset further including headphones, said headphones operable to provide sound to a user; and
   a first dispenser, said first dispenser being mounted to said support frame, said first dispenser operably coupled to said central processing unit, said first dispenser configured to discharge a liquid therefrom.

9. The virtual reality gaming station as recited in claim 8, and further including a heat source, said heat source being an infrared bulb, said heat source being mounted to said support frame, said heat source operable to provide a tactile experience of heat to a user during utilization of the virtual reality gaming station.

10. The virtual reality gaming station as recited in claim 9, and further including a second fan, said second fan being mounted to said support frame, said second fan configured to provide a stream of air that is perpendicular to a user superposed on said support platform.

11. The virtual reality gaming station as recited in claim 10, and further including a monitor and at least one speaker, said monitor and at least one speaker being mounted to said mounting post, said monitor and said at least one speaker operable to provide a visual images and sound to individuals proximate the virtual reality gaming station.

12. The virtual reality gaming station as recited in claim 11, and further including a third fan, said third fan being mounted to said mounting posts, said third fan configured to direct a stream of air downwards on a user superposed the platform.

13. The virtual reality gaming station as recited in claim 12, and further including a second dispenser, said second dispenser mounted to said support frame and operably coupled to said central processing unit, said second dispenser configured to produce an olfactory sensation to a user of the virtual reality gaming station.

14. The virtual reality gaming station as recited in claim 13, and further including a bass transducer, said bass transducer operably coupled to said central processing unit, said bass transducer mounted to said platform, said bass transducer configured to provide vibrations to a user superposed on said platform.

15. A portable virtual reality gaming station that is configured to provide a plurality of tactile sensations associated with visual images being presented to a user comprising:
  a platform, said platform being annular in shape and planar in manner, said platform having an upper surface configured to have a user superposed thereon, said upper surface including a user engagement ring, said user engagement ring configured to have a user stand thereon, said user engagement ring being peripherally disposed on said platform, said platform having a centrally located aperture, said centrally located aperture having a screen disposed thereacross, said user engagement ring encircling said centrally located aperture, said platform having a fan operably mounted thereto, said fan being secured in said aperture, said fan configured to provide a stream of air directed upwards at a user superposed on said platform,
  a support frame, said support frame constructed of a plurality of vertical members and horizontal members, said support frame extending upward from said platform, said support frame circumferentially surrounding a portion of the platform, said support frame configured to define an opening, said opening operable to provide access for a user to access said platform;
  a mounting post, said mounting post being secured to said support frame, said mounting post extending upward from said support frame;
  a central processing unit, said central processing unit having the necessary electronics to receive, store, transmit and manipulate data, said central processing unit configured to control operation of the virtual reality gaming station;
  a user suspension assembly, said user suspension assembly being operably coupled to said mounting post, said user suspension assembly configured to partially suspend a user over said platform, said user suspension assembly further including a chain, said chain being secured to said mounting post, said user assembly further including a belt, said belt being secured to said chain distal to said mounting post, said belt configured to surroundably mount a torso of a user;
  a headset, said headset configured to be surroundably mounted to a user's head, said headset further including a display configured to provide a visual image to a user, said headset further including headphones, said headphones operable to provide sound to a user;
  a first dispenser, said first dispenser being mounted to said support frame, said first dispenser operably coupled to said central processing unit, said first dispenser configured to discharge a liquid therefrom;
  a second dispenser, said second dispenser mounted to said support frame and operably coupled to said central processing unit, said second dispenser configured to produce an olfactory sensation to a user of the virtual reality gaming station; and
  a second fan, said second fan being mounted to said support frame, said second fan configured to provide a stream of air that is perpendicular to a user superposed on said support platform.

16. The virtual reality gaming station as recited in claim 15, and further including a bass transducer, said bass transducer operably coupled to said central processing unit, said bass transducer mounted to said platform, said bass transducer configured to provide vibrations to a user superposed on said platform.

17. The virtual reality gaming station as recited in claim 16, and further including a third fan, said third fan being mounted to said mounting posts, said third fan configured to direct a stream of air downwards on a user superposed the platform.

18. The virtual reality gaming station as recited in claim 17, and further including a heat source, said heat source being an infrared bulb, said heat source being mounted to said support frame, said heat source operable to provide a tactile experience of heat to a user during utilization of the virtual reality gaming station.

19. The virtual reality gaming station as recited in claim 18, and further including a monitor and at least one speaker, said monitor and at least one speaker being mounted to said mounting post, said monitor and said at least one speaker operable to provide a visual images and sound to individuals proximate the virtual reality gaming station.

20. The virtual reality gaming station as recited in claim 19, wherein the support frame is manufactured from metal tubing.

* * * * *